[12] United States Patent
Ding et al.

(10) Patent No.: US 8,478,048 B2
(45) Date of Patent: Jul. 2, 2013

(54) OPTIMIZATION OF HUMAN ACTIVITY DETERMINATION FROM VIDEO

(75) Inventors: Lei Ding, Hawthorne, NY (US); Quanfu Fan, Hawthorne, NY (US); Sharathchandra U. Pankanti, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 12/832,379

(22) Filed: Jul. 8, 2010

(65) Prior Publication Data

US 2012/0008819 A1 Jan. 12, 2012

(51) Int. Cl.
*G06K 9/46* (2006.01)
*G06K 9/00* (2006.01)

(52) U.S. Cl.
USPC .......................................... 382/190; 382/100

(58) Field of Classification Search
None
See application file for complete search history.

(56) References Cited

U.S. PATENT DOCUMENTS

| | | | |
|---|---|---|---|
| 5,965,861 A | 10/1999 | Addy et al. | |
| 7,631,808 B2 | 12/2009 | Kundu et al. | |
| 2006/0243798 A1* | 11/2006 | Kundu et al. | 235/383 |
| 2007/0272734 A1 | 11/2007 | Lipton et al. | |
| 2008/0018738 A1 | 1/2008 | Lipton et al. | |
| 2009/0226099 A1 | 9/2009 | Kundu et al. | |
| 2010/0013926 A1 | 1/2010 | Lipton et al. | |

FOREIGN PATENT DOCUMENTS

| | | |
|---|---|---|
| WO | 03044727 A1 | 5/2003 |
| WO | 2007002763 A2 | 1/2007 |
| WO | 2007078475 A2 | 7/2007 |

OTHER PUBLICATIONS

Fan et al., "Detecting sweethearting in retail surveillance videos", Apr. 24, 2009, ICASSP 2009, p. 1449-1452.*
Rasmussen et al., "The Infinite Gaussian Mixture Model", Dec. 8, 2004, MIT Press, Advances in Neural Information Processing Systems 12, p. 554-560.*
Fan et al., "Recognition of repetitive sequential human activity", Jun. 25, 2009, CVPR 2009, p. 943-950.*
Laptev et al., "Space-time interest points", Oct. 16, 2003, Ninth IEEE International Conference on Computer Vision, 2003, vol. 1, p. 432-439.*
Andrews et al. "Multiple Instance Learning with Generalized Support Vector Machines", 2002, AAAI, AAAI-02 Proceedings, p. 943-944.*

(Continued)

*Primary Examiner* — Stephen R Koziol
*Assistant Examiner* — Timothy Choi
(74) *Attorney, Agent, or Firm* — Patrick J. Daugherty; Driggs, Hogg, Daugherty & Del Zoppo Co., LPA

(57) ABSTRACT

In an embodiment, automated analysis of video data for determination of human behavior includes providing a programmable device that segments a video stream into a plurality of discrete individual frame image primitives which are combined into a visual event that may encompass an activity of concern as a function of a hypothesis. The visual event is optimized by setting a binary variable to true or false as a function of one or more constraints. The optimized visual event is processed in view of associated non-video transaction data and the binary variable by associating the optimized visual event with a logged transaction if associable, issuing an alert if the binary variable is true and the optimized visual event is not associable with the logged transaction, and dropping the optimized visual event if the binary variable is false and the optimized visual event is not associable.

22 Claims, 4 Drawing Sheets

OTHER PUBLICATIONS

Alon J et al, "A Unified Framework for Gesture Recognition and Spatiotemporal Gesture Segmentation", IEEE Trans. on Pattern Analysis and Machine Intelligence, vol. 30, No. 9, Sep. 1, 2009, pp. 1685-1699.

Lei Ding et al, "Graph Based Event Detection from Realistic Videos Using Weak Feature Correspondence", 2010 IEEE Int. Conf. on Acoustics Speech and Signal Processing, Mar. 14, 2010, pp. 1262-1265.

Rafael Lazimy, "Mixed-Integer Quadratic Programming", Mathematical Programming, vol. 22, Jan. 1, 1982, pp. 332-349.

Laurence A. Wolsey, "Mixed Integer Programming", In: Encyclopedia of Computer Science and Engineering, Jan. 1, 2008, pp. 1-10.

Lei Ding et al, "An Integer Programming Approach to Visual Compliance", Image Processing (ICIP), 2010 17th IEEE International Conference on, IEEE, Piscataway, NJ, USA, Sep. 26, 2010, pp. 1461-1464.

International Search Report for International Application No. PCT/EP2011/061352, dated Nov. 21, 2011.

S. Pankanti et al, Multi-media Compliance: A practical paradigm for managing business integrity, IEEE, Jul. 1, 2009, pp. 1562-1563.

Quanfu Fan et al, Detecting Sweethearting in Retail Surveillance Videos, IBM paper, IBM T.J. Watson Research Center, Hawthorne, NY, 4 pp.

Quanfu Fan et al, Recognition of Repetitive Sequential Human Activity, IBM paper, IBM T.J. Watson research Center, Hawthorne, NY, 9 pp.

Pavan Turaga et al, Machine Recognition of Human Activities: A survey, IEEE, 2008, 15 pp.

Laptev, Marszalek, Schmid and Rozenfeld, Learning Realistic Human Actions from Movies, CVPR08, 2008, 8 pp.

* cited by examiner

OPTIMIZATION OF HUMAN ACTIVITY DETERMINATION FROM VIDEO

BACKGROUND

The present invention relates to the analysis of human activities in videos, and more particularly to accurately distinguishing between behaviors represented thereby.

In a variety of contexts there may be a desire to monitor human activities for the occurrence or omission of certain activities, for example to comply with activity processes and policies. Compliance failures may result in injuries from failure to observe safety regulations or physical barriers, theft in business and retail establishments and other losses or loss exposures. Gaps in procedure may be identified for remedy, for example through retraining, by capturing and recording behavior deviations with video systems for subsequent or contemporaneous analysis. However, human review and analysis of video feeds is time consuming and perhaps inefficient with respect to human resources allocations, and accordingly it is desirable to implement automated systems for video analysis. Automated analysis of videos for determining human activities and behaviors presents a number of challenges, including providing for desired levels of accuracy in determinations of occurrences of human activities of concern, which must be recognized and sometimes distinguished from other activities, and wherein false alerts and missed event recognitions must occur at an acceptable level.

BRIEF SUMMARY

According to one embodiment of the present invention, a method for automated analysis of video data for determination of human behavior includes providing a programmable device that segments a video stream into a plurality of discrete individual frame image primitives. A set of the primitives is combined into a visual event that may encompass an activity of concern as a function of a hypothesis. The visual event is optimized by setting a binary variable to true or false as a function of one or more constraints. The optimized visual event is processed in view of non-video transaction data associated with the video stream and the binary variable by associating the optimized visual event with a logged transaction if associable with the logged transaction, issuing an alert that the optimized visual event may comprise the activity of concern if the binary variable is true and the optimized visual event is not associable with the logged transaction, and dropping the optimized visual event if the binary variable is false and the optimized visual event is not associable with the logged transaction.

In another aspect, a computer system for automated analysis of video data for determination of human behavior has a CPU, computer readable memory and a computer readable storage media, wherein program instructions are stored on the computer readable storage media for execution by the CPU via the computer readable memory. First of the program instructions are to segment a video stream into a plurality of discrete individual frame image primitives. Second of the program instructions are to combine a set of the primitives into a visual event that may comprise an activity of concern as a function of a hypothesis. Third of the program instructions are to optimize the visual event by setting a binary variable to true or false as a function of at least one constraint. Fourth of the program instructions are to process the optimized visual event as a function of non-video transaction data associated with the video stream and the binary variable by associating the optimized visual event with a logged transaction of the non-video transaction data if the optimized visual event is associable with the logged transaction, issuing an alert that the optimized visual event may comprise the activity of concern if the binary variable is true and the optimized visual event is not associable with the logged transaction, and dropping the optimized visual event if the binary variable is false and the optimized visual event is not associable with the logged transaction.

In another aspect, a service contract for automated analysis of video data for determination of human behavior from a video stream encompasses a specification of unambiguous rules of interaction for automated analysis of video data adapted to facilitate segmenting a video stream into a plurality of discrete individual frame image primitives. The service contract further provides for combining a set of the primitives into a visual event that may comprise an activity of concern as a function of a hypothesis, optimizing the visual event by setting a binary variable to true or false as a function of at least one constraint, and processing the optimized visual event as a function of non-video transaction data associated with the video stream and the binary variable. The processing comprehends associating the optimized visual event with a logged transaction of the non-video transaction data if the optimized visual event is associable with the logged transaction, issuing an alert that the optimized visual event may comprise the activity of concern if the binary variable is true and the optimized visual event is not associable with the logged transaction, and dropping the optimized visual event if the binary variable is false and the optimized visual event is not associable with the logged transaction.

In another aspect, a computer program product for automated analysis of video data for determination of human behavior includes a computer readable storage medium having program instructions stored thereon. First of the program instructions are to segment a video stream into a plurality of discrete individual frame image primitives. Second of the program instructions are to combine a set of the primitives into a visual event that may comprise an activity of concern as a function of a hypothesis. Third of the program instructions are to optimize the visual event by setting a binary variable to true or false as a function of at least one constraint. Fourth of the program instructions are to process the optimized visual event as a function of non-video transaction data associated with the video stream and the binary variable. The processing comprehends associating the optimized visual event with a logged transaction of the non-video transaction data if the optimized visual event is associable with the logged transaction, issuing an alert that the optimized visual event may comprise the activity of concern if the binary variable is true and the optimized visual event is not associable with the logged transaction, and dropping the optimized visual event if the binary variable is false and the optimized visual event is not associable with the logged transaction.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
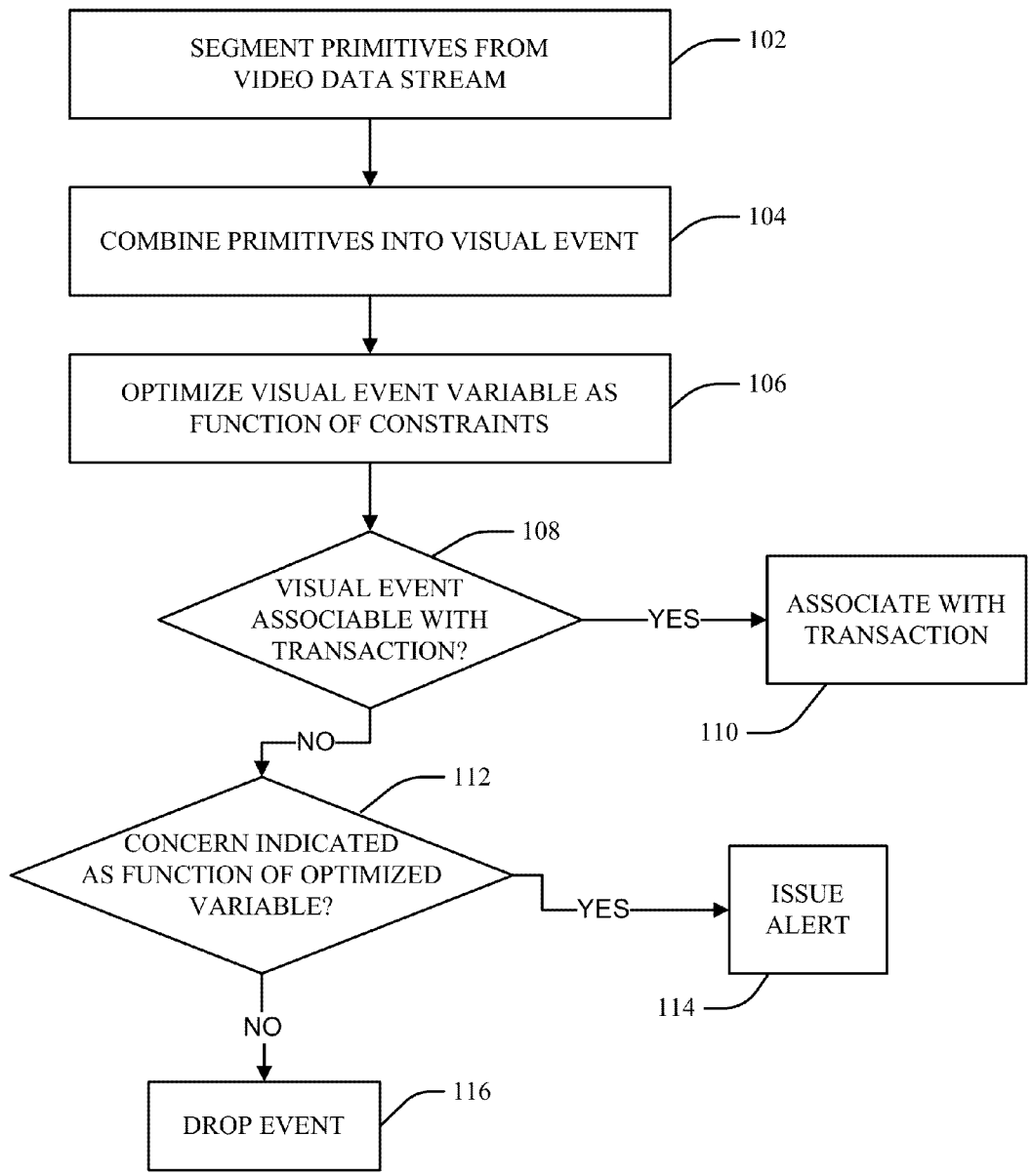
FIG. 1 illustrates an embodiment of a method or system for optimization of automated analysis of video data for determination of human behavior according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Historically, compliance of human activity with policies, regulations, etc. has typically been enforced through direct human surveillance. For example, safety and security personnel may watch cameras trained on certain areas to discover deviations from safety policies, trespassing, theft, unauthorized access to restricted areas, etc. However, human visual attention may be ineffective, particularly for large volumes of video data. Due to many factors, illustratively including an infrequency of activities of interest, a fundamental tedium associated with the task and poor reliability in object tracking in environments with visual clutter and other distractions, human video surveillance may be both expensive and ineffective.

Some approaches may focus instead on data outputs associated with human activities, business transaction logs, retail receipts, injury reports, etc. Such data may be stored in an intermediate storage medium, such as a relational database, which is then subject to human queries and/or data mining processes. While such data mining processes may be effective in finding some incidents of interest, many statistical anomalies are not strongly correlated with an activity of concern, thus limiting the efficacy of pure data mining. Moreover, events detectable through data mining are necessarily limited to events strongly tied to a paper trail or other data representation output, and accordingly such methods may fail to capture a purely visual event not associated with such a data output; for example, an employee or agent neglecting to place a "Caution" sign near a public area that has just been mopped. Further, some events partly described by a process log may not indicate an associated activity amenable to detection through visual analysis of a video feed, for example where a first authorized person swipes a badge in a badge entry system to gain entry and is tailgated by another, second unauthorized or unrecognized person, the second person also thereby gaining entry without leaving a badge-swipe record.

Automated video surveillance systems and methods are also proposed or known, wherein computers or other programmable devices directly analyze video data and attempt to determine the occurrence of activities of concern. However, object tracking by prior art automated video surveillance systems and methods systems is often not reliable in realistic, real-world environments and applications due to clutter, poor or variable lighting and object resolutions and distracting competing visual information. Analysis of human activity within the video is generally limited to capturing and recognizing a set of certain predominant activities, each of which requires supervised learning and thus lots of labeled data, and wherein new constraints may not be added or defined to refine or enforce complete visual compliance determinations.

Referring now to FIG. 1, an embodiment of a method or system for optimization of automated analysis of video data for determination of human behavior according to the present invention is illustrated. At 102 a programmable device applies an algorithm, according to the present invention, to a video stream to segment a portion of the video stream into a plurality of discrete, individual primitive frame image events. At 104 the programmable device applies a hypothesis algorithm to combine a set of the primitives into a visual event that may comprise an activity of concern.

At 106 the visual event is further optimized as a function of constraints, resulting in the setting of a binary variable or variables to true or false. At 108 the optimized visual event is processed as a function of non-video transaction data associated with the video stream (for example, a retail transaction log listing items scanned by reference to the bar code of each item, a turnstile admission log, a bar code log provided by a door or gate scanner, etc.) and of the binary variable(s) set at 106. If determined at 108 that the optimized visual event is associable with a logged transaction in view of the binary variable(s), then the visual event is associated with said logged transaction at 110.

Otherwise, it is determined at 112 whether the visual event may comprise an activity or behavior of concern as a function of the binary variable(s) and of the determination at 108 that the optimized visual event is not associable with a logged transaction. If determined at 112 that the optimized visual event may comprise an activity or behavior of concern, an alert is issued at 114, else the event is dropped or otherwise disregarded at 116.

Embodiments of the present invention detect activities or behaviors of concern in human activities through optimizing qualities that characterize true event occurrences as a function of one or an array of easily coded constraints derived from an actual or real activity environment depicted within the video stream. Algorithms according to the present invention are effective, scalable and extensible for enforcing visual compliance with one or more policies or regulations in a specified environment or elsewhere, and wherein the true and/or false activities may have predefined patterns. Constraints may be selected as a function of the anticipated environment of the source of the video, and may be easily extended to adapt to new conditions, applications or video source environments.

Algorithms according to the present invention apply a mixed integer quadratic programming or algorithm as an optimization tool to address an activity discernment or detection problem in a specified or expected video environment, based on (as a function of) an objective having a linear term for visual quality and a quadratic term for temporal quality. Embodiments may utilize a binary integer program for detecting specified events within a video input which enables enforcing visual compliance in the video environment, the program maximizing essential quantities that characterize true events of interest subject to an array of well-grounded constraints wherein binary decision variables correspond to the presence of a set of hypothesized visual events. In objective functions, binary variables may be weighted by quality measures derived from infinite Gaussian mixture modeling of video content such that maximizing an overall quality measure is expected to uncover the meaningful visual events.

Embodiments of the present invention segment video into a plurality of discrete, individual primitive frame image events $\{p_i\}$ using frame differentiating. Hypothesis $\{h_i\}$ generation is performed by combining primitives close in time to form discrete visual events that may comprise an activity of concern, namely $h_i=\{p_{i1}, p_{i2}, \ldots, p_{im}\}$, wherein $\{i_j\}$ is the index for a primitive, and wherein certain temporal constrains may be enforced in accordance with the physical conditions of activities. Frame differentiating into primitive frame image events $\{p_i\}$ and hypothesis $\{h_i\}$ generation may be a function of observing repetitive human actions expected within certain video scenarios, for example common scanning motions in retail checkout stations or common, expected task motions in factory assembly lines, etc. Thus, human activity may be considered as hypothetical sets $\{h_i\}$ of repeated sequential events (or visual work units), each of which is composed of a sequence of relatively isolated and separable primitive frame image events $\{p_i\}$ with strong spatiotemporal constraints.

One embodiment of the present invention of FIG. 1 receives a video stream of a register from a retail establishment at 102 and identifies and segments certain activities of a cashier within the video feed into a plurality of still primitive pick-up, scan and drop images that may be used to construct discrete sets of possible "sweet-hearting" visual events at 104. Sweet-hearting or "fake scanning" describes the action of a cashier in intentionally failing to scan or otherwise enter an item into a retail transaction in order to provide the merchandise free of charge for a customer presenting the items for purchase, usually by moving the item from an input (pick-up) location through the processing (scan) area and into the output (drop or bagging) area by covering up the item bar code, stacking an item on top of another to occlude the scanner from reading the code or passing the item around the scan area during a scan motion to intentionally avoid a bar code reader in the scan area with respect to a bar code of the free item.

A significant portion of retail shrink may be attributed to employees and occurs around cashiers at the point of sale (POS). While human surveillance has long been used to monitor transactions at the POS, it is not generally very effective in catching subtle differences in true scan and fake scan motions near bar code scanners, and further suffers from scalability issues. Data mining may be used to analyze transaction logs (TLOG) to infer cashiers' suspicious behaviors based on statistical analysis, but observed statistical anomalies may not be strongly correlated with sweet-hearting or other fraudulent activity of the cashier. Further, fake scans may occur rarely relative to a total number of scanned items processed at a given checkout station; in one example, fake scanning may occur no more frequently than two faked scan items per scanning lane per day, and therefore detecting and preventing this loss requires observing and distinguishing only two items processed by a cashier that do not have a corresponding listing in a retail transaction log of that scanning lane listing all items scanned (generally by reference to the bar code of each item, though other systems for item tracking are contemplated). Therefore, close human attention through video surveillance may not be effective or efficient in preventing sweet-hearting.

Figure 2:
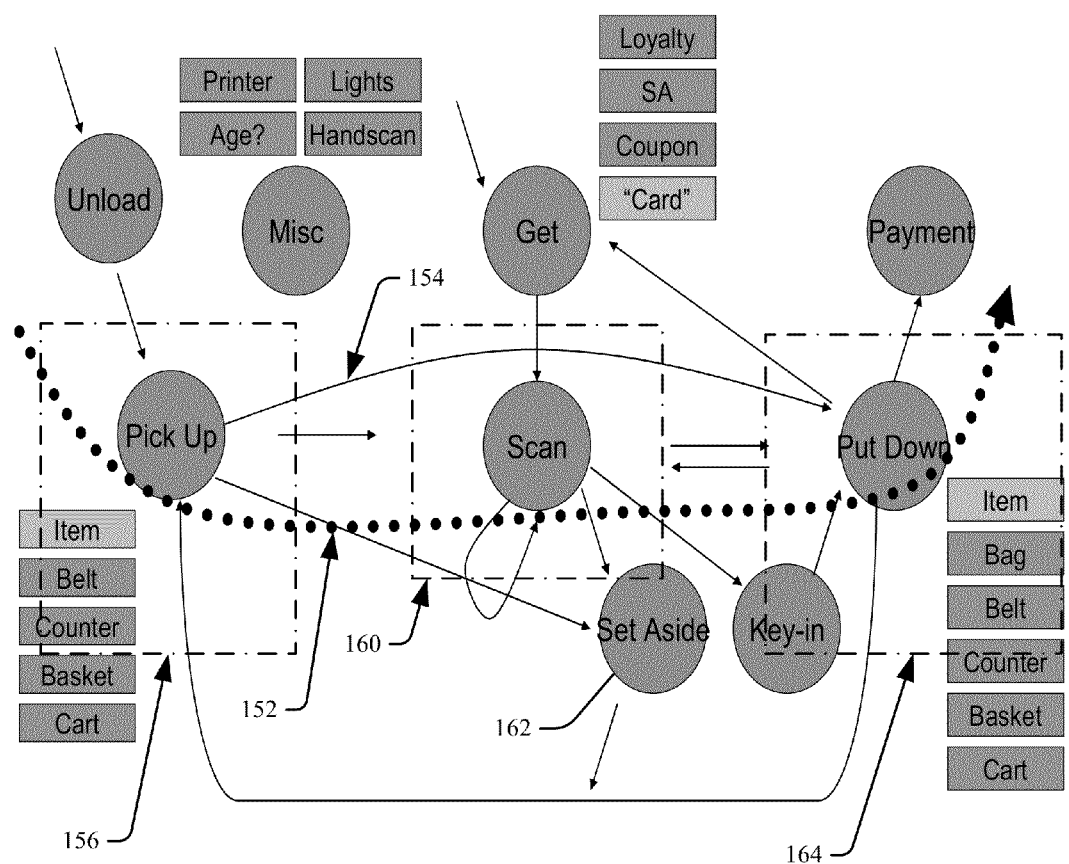
FIG. 2 illustrates a state diagram of possible human movements for automated recognition according to the present invention.

Automated determination of and distinguishing between true and false sweet-hearting events may be difficult in the prior art due to the large variety of possible human movements that may be observed and considered. FIG. 2 is an overhead perspective state diagram of a plurality of possible movements and actions 162 of a cashier in a retail context (for example of a scanning lane) with respect to possible movement vectors 152, 154. (It will be understood that as used herein "cashier" is a generic term to denote a person scanning an item, and that embodiments contemplate that the scanning person may be a clerk or cashier as well as a customer, bagger, manager or other person.) Vector 152 is a simple scanning motion path 152, wherein an item is picked-up from a pick-up area 156, scanned by passing the item within scanning range of a scanner in a scanning area 160 and then put down in a bagging or drop area 164. Examples of the pick-up areas 156 include an intake belt, a counter, a shopping basket and a cart, and the put-down area 164 may be one or more of a distribution belt, counter, shopping basket or shopping cart, each of which may entail different motions, and each of which may have different time signatures (for example, it may take longer to reach into a cart for a pick-up or a drop relative to a belt pick-up or drop). Thus true scanning events, which may trigger false fake scan/sweet-hearting alerts, may have a variety of divergent motions and time signatures.

The vectors 154 each represent an observed motion relative to other actions 162 of a cashier and observable in a video feed, illustratively including unloading items, and getting and scanning loyalty cards, supervisor/assistant override cards (SA), coupons or other bar-code cards. Movement of some items from the pick-up area 156 may bypass the scanning area 160 before entering the put-down area 164, sometimes for legitimate purposes, for example set aside in combination with directly keying-in of an item code with a missing or damaged bar code, or in weighing an item sold by weight. Video feeds for individual scans may also differ as a result of different cashier or environmental characteristics, for example an observed receipt printer may function differently as a result of running out of paper, lighting may change due to time of day (daylight versus artificial lighting at night), and the age or physical size or ability of the individual cashiers may impact the range of arm motion, motion paths selected or the times to complete similar paths relative to other cashiers. Accordingly, automated systems must account for many variances and divergences of images of sweet-hearting relative to similar legitimate scanning activities in order to observe and distinguish true fake-scan events from false positives and avoid issuing too many false alarms or missing too many fake scans.

In embodiments of the present invention distinct Region of Interests (ROI) are defined for the creation of and analysis of primitives. Motion pixels obtained by frame differencing (or differentiating) a video stream are counted in each ROI for each frame and normalized by the area of the ROI. Referring again to FIG. 2, in an embodiment adapted to determine sweet-hearting in an "in/out" scanning process a pick-up area 156, a scan area 160 and a drop-off area 164 are defined for creating respective pick-up, scan and drop-off primitives as a function of patterns observed in motion sequences within said areas, generally in responsive to motion pixels associated with the movement of an item and/or a hand (or both hands) of a cashier within each region. Each area 156/160/164 may itself define a ROI, with motion pixels obtained by frame differencing a video stream are counted in each ROI for each frame and normalized by the area of the respective ROI 156/160/164. Alternatively, any region 156/160/164 may encompass multiple distinct (and sometimes overlapping) ROI's to provide additional granularity or primitive creation capabilities.

Figure 3:
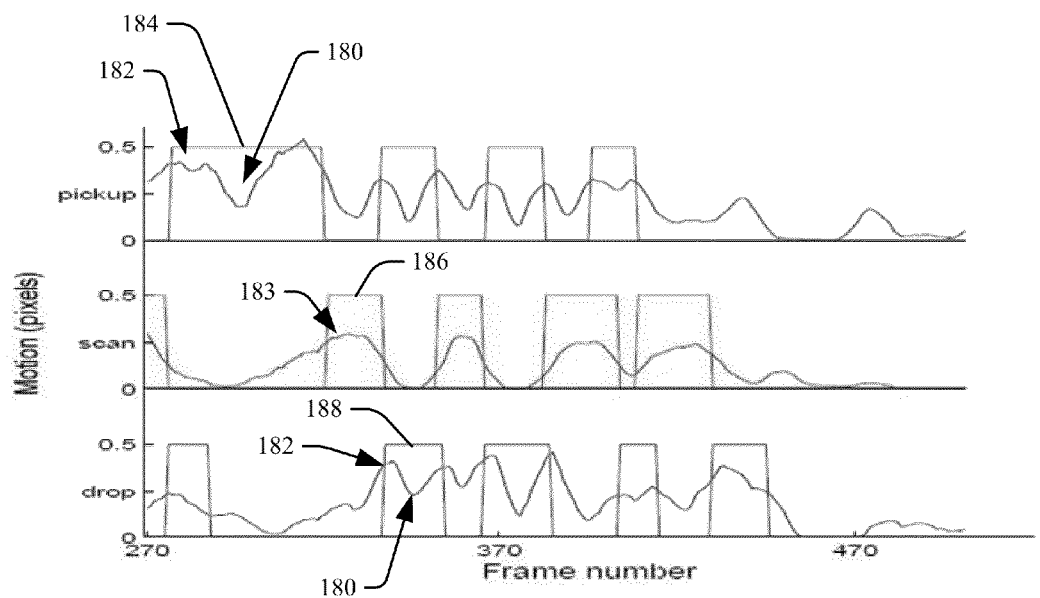
FIG. 3 is a graphical illustration of motion sequences for exemplary events according to the present invention.

One example of pick-up, scan and drop-off primitives created through distinguishing within patterns observed in resulting motion sequences within ROI's and appropriate for practice with the present invention is taught by "Detecting Sweethearting in Retail Surveillance Videos" by Quanfu Fan et al., ICCASSP, 2009, wherein FIG. 3 provides exemplary graphical illustrations for motion sequences for each of pickup, scan and drop events. Each pickup and drop event may be recognized by a pair of peaks 182 with a valley 180 located in-between, depicting a motion change caused by an interaction between a cashier's hand(s) and a specified region during an event. The valleys 180 correspond to the moment of a short pause when a hand is about to reach an item (pickup) or to retrieve an item (drop), and the locations of the two associated peaks 182 roughly correspond to a start and an end time of an event.

Figure 4:
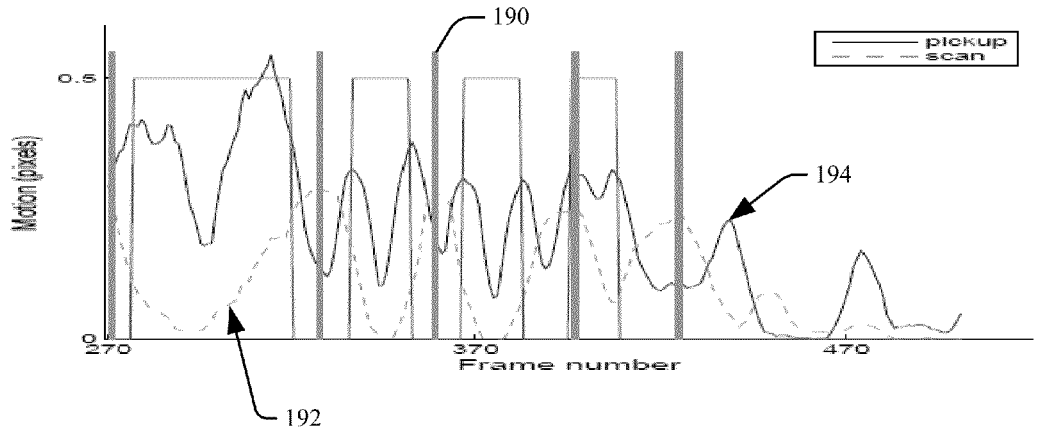
FIG. 4 is a graphical illustration of overlaying exemplary event profiles according to the present invention.

While patterns indicated by primitive events may be visually identifiable, it may be difficult to segment them in a motion sequence. Fortunately, temporal ordering of events may help resolve this problem. Pickup, scan and drop occur sequentially, suggesting that there should be one pickup 184 prior to a scan 186 which is followed by a drop 188. Thus, scan event primitives may be identified by thresholding observed scan motions: for example, referring to FIG. 4, motion peaks 190 in each scan profile 192 may be located and used as dividers to separate pickup and drop events (illustrated presently through overlaying the scan profile 192 and a pick-up motion profile 194.

Space-Time Interest Points (STIPs) are spatiotemporal features computed from local image points with both large intensity change and large variations in time and roughly correspond to moments when there is abrupt motion change, such as stopping or starting; for example, see "Space-time interest points," I. Laptev and T. Lindeberg, ICCV 2003 at pp. 432-439. Several STIPs may be detected near a cashier's hand at the moment when the hand is about to reach (pickup) or drop an item, and thus a STIPs detector may automatically select spatial and temporal scales with regard to the size and duration of said events wherein a spatio-temporal volume is formed for each STIP and further divided into grids of cuboids. In some embodiments, histograms of oriented gradient (HoG) and optic flow (HoF) may be computed, normalized and concatenated into a local descriptor for each cuboid.

A primitive event may also be considered as an interaction between a cashier's hand(s) and a specified area. However, this interaction may be un-oriented and can occur almost anywhere in a given specified area, posing a problem for defining an appropriate ROI for an event model. Providing an ROI large enough to cover all anticipated or possible locations of events to be detected likely includes many irrelevant STIPs resulting from a cashier or other person and, in order to alleviate this problem, multiple-instance learning technique may be applied to build location-aware event models. Thus, some embodiments use multiple overlapped ROIs to cover a primitive transaction area as much as possible so that each event is guaranteed to be in at least one ROI, and wherein multiple-instance learning (MIL) is used to resolve problems of learning from incompletely labeled data, for example where correspondences are missing. Unlike supervised learning in which every training instance may be associated with a label, MIL deals with data where labels (usually binary, either 0 or 1) are assigned to bags of instances instead of an individual instance. A positive bag has at least one positive instance that is related to a concept of interest while all instances in a negative bag are negative. The goal of MIL in some embodiments according to the present invention is to learn a model of the concept from the incompletely labeled data for classification of unseen bags or instances.

Learning event models from multiple ROIs may be naturally connected to MIL in that each event corresponds to at least one ROI, but wherein the correspondence is not specified. In some embodiments, a Bag of Features (BOF) model is built to represent an event wherein spatio-temporal features from a specified region are clustered into discrete "visual words" groups based on their similarities and a histogram of word occurrence frequency is constructed to form a compact representation of the event, the histogram representation is used for classification with approaches. Examples of BOF modeling are taught by "Learning realistic human actions from movies" by Marszalek et al., CVPR08 2008, and other examples will be apparent to one skilled in the art. Thus, for each annotated event, embodiments may create a positive bag, the instances of which are the histograms of visual words from all the ROIs under a BOF representation. Negative bags can be generated in a similar way by considering those video segments with sufficient motion change but no primitives annotated in the ground truth. Thus, some embodiments according to the present invention use a Support Vector Machine (SVM) based MIL algorithms (MIL-SVM) to learn event models for pickup and drop, for example see S. Andrews, T. Hofmann, and I. Tsochantaridis, "Multiple instance learning with generalized support vector machines," Artificial Intelligence pp. 943-944, 2002. Further, as scan events may be limited to a small region only use of a single ROI may be required for the scan primitive event determination.

One example for event hypothesis $\{h_i\}$ generation from individual primitive frame image events $\{p_i\}$ appropriate for use with embodiments of the present invention is provided in "Recognition of Repetitive Sequential Human Activity" by Quanfu Fan et al., 2009 IEEE Conference on Computer Vision and Pattern Recognition, which provides a general graphical representation for a sequential event wherein $\{e^k_t\}$ is the $k^{th}$ primitive in a sequential event that occurs at a time t. A sequential event S is defined as a temporally ordered set of primitives $\{e^1_{t1}, e^2_{t2}, \ldots, e^n_{tm}\}$ such that $t_1 < t_2 < \ldots < t_n$. (It will be noted that for purposes of clarity, superscripts may be omitted when discussing variables herein). Further, each primitive $\{e_{ti}\}$ in a sequential event location node $\{l_{ti}\}$ may be associated with an appearance node $\{v_{ti}\}$ representing visual information and a location node $\{l_{ti}\}$ that denotes a spatial location of where the primitive occurs, wherein in a spatial model a general node C associated with the location nodes $\{l_{ti}\}$ may place spatial constraints on the primitives. The primitives in a sequential event follow a Markovian model, such that the probability of S under the observation O=(v; l) is given by:

$$p(O|S) \propto p(v|S)p(l|S) = \quad [1]$$

$$p(v_{t_1}|e_{t_1}) \prod_2^n p(v_{t_i}|e_{t_i})p(e_{t_i}|e_{t_{i-1}}) \cdot \prod_1^n p(l_{t_i}|e_{t_i}),$$

where $v=\{v_{t1}, v_{t2}, \ldots, v_{tm}\}$ and $l=\{l_{t1}, l_{t2}, \ldots, l_{tm}\}$ represent the visual cues and spatial information respectively. Here, $p(v_{ti}|e_{ti})$ is the appearance likelihood model for the primitive $e_{ti}$ while $p(l_{ti}|e_{ti})$ is a spatial likelihood model for $e_{ti}$, and $p(e_{ti}|e_{t_{i-1}})$ is the transition probability from primitive $et_{i-1}$ to primitive $e_{ti}$.

Assume n sets of primitives $\{E_1, E_2, \ldots, E_n\}$ detected in a video sequence, where $E_m$ is a set of primitives with a specific type m (for example, all possible pickups in a cashier scenario). A candidate sequential event S may thus be formed by selecting a primitive from each set with temporal order, considering all such candidates by enumerating samples in $\{E_1, E_2, \ldots, E_n\}$, the candidates starting from a primitive $e^1_{ti} \in E_l$ by a sequence tree denoted by Tr(i, :) rooted at $e^1_{ti}$ wherein any node at the j-th level is selected only from set $E_j$ and all the children of the node occur in later primitive sets. Each path from the root of the sequence tree to a leaf node corresponds to a candidate for a sequential event S.

The sequence tree combination scheme described above yields a great number of candidate sequential events, and the number of sequential event candidates generated grows exponentially with the number of primitives. However, the majority are spurious, especially when the results of primitive detection are noisy. Thus, it is desirable to select a small set of sequential events that best match a truth in the data, for example in the case of a sweet-hearting determination as to whether the visual event created from the primitives is a true fake scan or a false alert. Accordingly, according to the present invention, each hypothesis $h_i$ is associated with a binary decision variable $x_i$ that represents its selection in the final results as determined by a binary integer program. Thus, optimization at 106 of FIG. 1 results ultimately in selection of an event or not at 112, wherein an event i is detected if $x_i=1$ and otherwise dropped at 116; in some sweet-hearting determination embodiments according to the present invention, the binary decision variable $x_i$ is a fake scan indicator, wherein if $x_i=1$ indicates a true fake scan indication and a value of zero indicates a false alert. Optionally, alerts can be triggered at 114 (for example, in a surveillance environment) based on the event detection results, for example, when $x_i=1$ but without a corresponding entry in a transaction-log or other database as determined at 108. Thus, in embodiments for sweet-hearting applications, when $x_i=1$ but without a corresponding match to (thus associable with) one of the list of scanned items in a retail transaction log.

Binary integer program formulations appropriate for embodiments of the present invention include:

$$\max \sum_{i=1}^{N} q_i x_i + \lambda \sum_{i=1}^{N} \sum_{j=1}^{N} c_{i,j} x_i x_j \quad [2]$$

$$\text{subject to: } \sum_{i=1}^{N} x_i \leq L \quad [3]$$

$$\sum_{i \in O_j} x_i \leq 1 (j = 1, \ldots, N) \qquad [4]$$

$$\sum_{i \in V_j} x_i \geq 1 (j = 1, \ldots, B) \qquad [5]$$

$$x_i \in \{0, 1\}, \qquad [6]$$

Formulation [2] represents an overall quality measure of events, wherein $\{c_{i,j}\}$ is a temporal affinity set by a Gaussian transformed temporal distance, also sometimes known as a quadratic integer term, determined as a function of the constraints [3] through [6]. Constraint [3] provides an upper bound L on the number of events. Constraint [4] represents temporal constraints, where j is the index for an event hypothesis, N is the total number of events and $O_j$ is the set of event hypotheses overlapping with hypothesis j at the primitive level (note that j $\in$ $O_j$). Constraint [5] represents alignment with a transaction log or other database (for example, each recorded scan in a transaction log should have at least one corresponding detected scan in a retail context), where j is the index for a logged transaction, B is the total number of transactions and $V_j$ is a set of hypotheses compassing a logged transaction j. Constraint [6] represents integer constraints on the decision variable(s).

The above formulation [2] with λ=0 may be solved with N+B+1 linear constraints by using linear programming based on a branch-and-bound algorithm, for example, as taught by "Integer Programming," L. Wolsey, John Wiley & Sons, 1998. Thus, methods and systems according to the present invention may search for an optimal solution to a binary integer programming problem by solving a series of linear programming relaxation problems, in which a binary integer requirement on the variables may be replaced by a weaker constraint of 0≦x≦1. It will also be noted that without constraint [5] above, application of the binary integer formulation [2] degenerates into a multiply-constrained Knapsack problem, which is conventional in combinatorial optimization. (As will be appreciated by one skilled in the art, a Knapsack problem comprehends, given a set of items each with a value and a cost, the cost being weight in the context of carrying a knapsack, determining a number of each item to include in a collection so that the total cost/weight is less than some given cost/weight and the total value is as large as possible.)

Optimization at 106 comprehends a quality measure of an individual event. Specifically, we consider each event created at 104 as a combination of event primitives where each primitive is represented as an unordered set of visual features (for example, including color appearance) and a consensus score is computed between primitives reflecting their compatibility within an event, which is then considered to define quality measures used in the optimization.

A video may be transformed into a set of feature descriptors at salient locations, and more particularly represented as $\{v_1, v_2, \ldots, v_{Nf}\}$ where $v_i$ is a description vector at an $i^{th}$ spatial-temporal salient location in the video. Spatial temporal interest points (STIP) may be used for interest point selection from videos, for example as taught by "Space-time interest points," I. Laptev and T. Lindeberg, ICCV 2003, but such examples may have associated high computational costs. Accordingly, some embodiments of the present invention take locally maximum points of a squared weighted gradient norm function as the interest points in a video pursuant to the following function [7]:

$$I(x, y, t): g(x, y, t) = \left(\frac{\partial I}{\partial x}\right)^2 + \left(\frac{\partial I}{\partial y}\right)^2 + \alpha \left(\frac{\partial I}{\partial t}\right)^2 \qquad [7]$$

wherein $\tilde{\alpha}$ is larger than 1 to emphasize the fact that temporally salient points are more likely to be related to interesting events. (x, y, t) points with relatively small g(*) values below a threshold $P^{th}$ percentile are excluded over a whole video clip in order to achieve truly spatial-temporal salient points. For example, color features may thus be extracted which are the average values in RGB channels inside a small window around the interest points.

In some embodiments, each event primitive P is treated as a bag of features (BOF) according to formulation [8]:

$$P = \{p_i\}_{i=1}^{Np} \qquad [8]$$

wherein $p_i$ is a color feature vector. According to the present invention, the BOF's detected from event primitives are modeled to improve feature consistency. More specifically, the visual quality of a hypothesized event may depend on models of features, not just the individual feature points. In some embodiments, a parametric mixture model comprises determining parameters of clusters as well as proportions of each cluster in a mixture. While conventional expectation maximization approaches provide no explicit solution to determining a number of clusters, this may be accomplished by embodiments of the present invention adopting a fully Bayesian approach like an infinite Gaussian mixture model (iGMM), for example as taught by C. Rasmussen, "The infinite Gaussian mixture model," NIPS 2000, which teaches an application of Dirichlet process mixture modeling.

One Gaussian mixture model appropriate for use according to the present invention is formulation [9]:

$$p(p_i \mid \pi, \theta) = \sum_{k=1}^{K} \pi_k \rho(p_i \mid \mu_k, \Sigma_k) \qquad [9]$$

wherein π and θ refer to the cluster weights and cluster parameters respectively, and ρ is a Gaussian density. In this fashion, a Markov chain is simulated whose equilibrium distribution is a Bayesian mixture model posterior distribution, which is a distribution over model parameters given all observations $p_i$, and wherein a Gibbs sampler is used for model parameters. When combined with conjugate priors used in an iGMM, methods and systems according to the present invention produce analytic conditional distributions for sampling.

After some time, a sampler according to the present invention converges to a set of samples from the posterior, i.e., to a set of feasible models given training features. A best-scored model $M_P$ is used for a primitive P such that it captures important appearance information in a way preferable to using individual feature points. Thus, two primitives A and B with learned models $M_A$ and $M_B$ can be checked for consistency by using the average log-likelihoods from formulations [10] and [11]:

$$\min \left\{ \frac{1}{n} \sum_{i=1}^{n} \log p_{M_A}(b_i) \right. \qquad [10]$$

$$\left. \frac{1}{m} \sum_{i=1}^{m} \log p_{M_B}(a_i) \right\} \qquad [11]$$

wherein Gaussian transformed average of these values over all adjacent pairs of primitives are defined as the visual quality of an event hypothesis. Thus, a visual quality measure may be normalized between 0 and 1, and further wherein a larger quality measure means a better event hypothesis in terms of visual consistency.

In one aspect, embodiments according to the present invention turn a selection process into an optimization problem where the strong temporal dependencies between primitive events and their spatial constraints are used to direct the optimization process. While a strict ordering may be demanded between primitives, two consecutive work units may overlap to an arbitrary degree as a natural byproduct of the rapid and repetitive nature of the activity. In one aspect, embodiments of the present invention may systematically use all the constraints available in the entire transaction (and not just one item) to make fraud determination and alert decisions based on simultaneous analysis of both video/transaction log stream.

Figure 5:
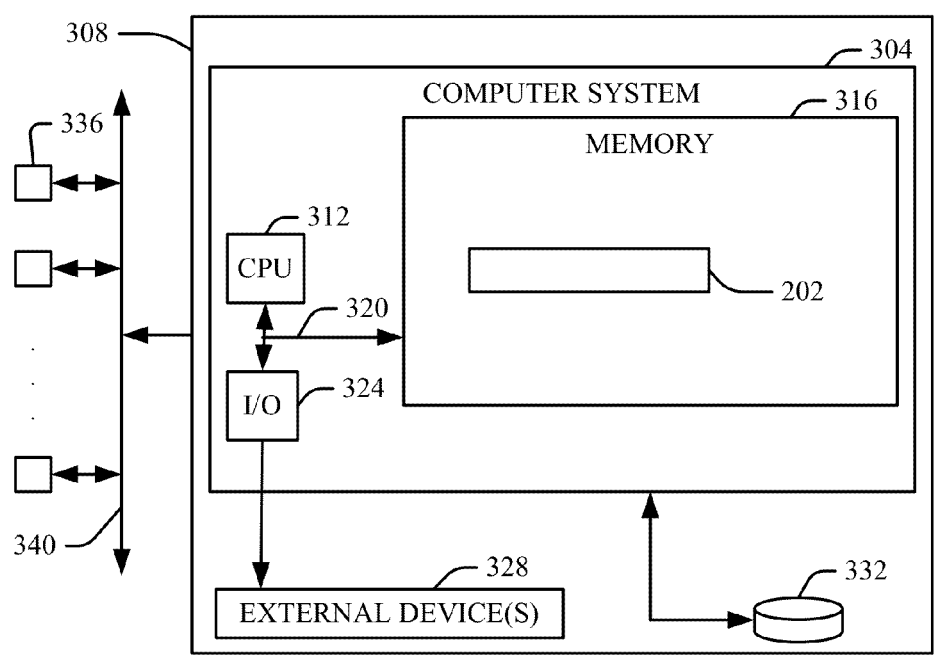
FIG. 5 is a computerized implementation of an embodiment of the present invention.

Referring now to FIG. 5, an exemplary computerized implementation of an embodiment of the present invention includes computer or other programmable device 304 in communication with devices 336 that analyzes video data for determination of human behavior according to the present invention, for example in response to computer readable code 202 in a file residing in a memory 316 or a storage system 332 through a computer network infrastructure 308. The implementation is intended to demonstrate, among other things, that the present invention could be implemented within a network environment (e.g., the Internet, a wide area network (WAN), a local area network (LAN) or a virtual private network (VPN), etc.) Communication throughout the network 308 can occur via any combination of various types of communications links; for example, communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the network infrastructure 308 is intended to demonstrate that an application of an embodiment of the invention can be deployed, managed, serviced, etc. by a service provider who offers to implement, deploy, and/or perform the functions of the present invention for others.

The computer 304 comprises various components, some of which are illustrated within the computer 304. More particularly, as shown, the computer 304 includes a processing unit (CPU) 312 in communication with one or more external I/O devices/resources 328 and storage systems 332. In general, the processing unit 312 may execute computer program code, such as the code to implement one or more of the process steps illustrated in FIG. 1, which is stored in the memory 316 and/or the storage system 332.

The network infrastructure 308 is only illustrative of various types of computer infrastructures for implementing the invention. For example, in one embodiment, computer infrastructure 308 comprises two or more computing devices (e.g., a server cluster) that communicate over a network. Moreover, the computer 304 is only representative of various possible computer systems that can include numerous combinations of hardware. To this extent, in other embodiments, the computer 304 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations. Further, I/O interfaces 328 can comprise any system for exchanging information with one or more of the external devices 336. Still further, it is understood that one or more additional components (e.g., system software, math co-processing unit, etc.), not shown, can be included in the computers 304 or devices 336.

One embodiment performs process steps of the invention on a subscription, advertising, and/or fee basis. That is, a service provider could offer to provide automated analysis of video data for determination of human behavior. In this case, the service provider can create, maintain, and support, etc., a computer infrastructure, such as the network computer infrastructure 308 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the processes, systems and articles for automated analysis of video data for determination of human behavior described above. In this case, a computer infrastructure, such as the computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as the computers 304 or devices 336, from a computer-readable medium; (2) adding one or more computing devices to the computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary," one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for automated analysis of video data for determination of human behavior, the method comprising:
 a programmable device segmenting a video stream of images of a cashier in a retail scanning lane into a plurality of discrete individual frame image primitives comprising:
  pick-up primitive segments that each comprise sequential frames of the video stream that have motion pixels associated with movement of at least one of an item and a hand of the cashier within an item pick-up region of interest of the retail scanning lane video stream images;
  scan primitive segments that each comprise sequential frames of the video stream that have motion pixels associated with movement of at least one of an item and a hand of the cashier within an item scanning region of interest of the retail scanning lane video stream images that is different from the pick-up region of interest; and
  drop primitive segments that each comprise sequential frames of the video stream that have motion pixels associated with movement of at least one of an item and a hand of the cashier within an item drop region of interest of the retail scanning lane video stream images that is different from the pick-up and scanning regions of interest;
 combining a set of one each of the pick-up, scan and drop primitives that are sequential and closest in time to each other into a visual event, wherein the visual event pick-up primitive is prior in time to the visual event scan primitive, and the visual event scan primitive is prior in time to the visual event drop primitive;
 determining a normalized visual quality value of one or zero for an average of feature vectors over an adjacent pair of the visual event primitives as a function of a Gaussian mixture model;
 setting a binary fake scan indicator variable for the visual event to true if the determined normalized visual quality value is one, or to false if the determined normalized visual quality value is zero; and
 processing the visual event as a function of the set binary fake scan indicator variable and of non-video retail transaction log data associated with the video stream that lists items scanned in the scanning lane, by:
  associating the visual event with one of a plurality of logged item bar code scan transactions of the non-video transaction data if the visual event is aligned with the one logged transaction within a Gaussian transformed temporal distance constraint;
  issuing an alert that the visual event is a fake scan if the binary fake scan indicator variable is true and the visual event does not align with any of the logged transactions within the Gaussian transformed temporal distance constraint; and
  dropping the visual event if the binary fake scan indicator variable is false and the visual event does not align with any of the logged transactions within the Gaussian transformed temporal distance constraint.

2. The method of claim 1, further comprising:
integrating computer-readable program code into a computer system comprising the processing unit, a computer readable memory and a computer readable tangible storage medium, wherein the computer readable program code is embodied on the computer readable tangible storage medium and comprises instructions that, when executed by the processing unit via the computer readable memory, cause the processing unit to perform the steps of segmenting the video stream of images into the individual frame image primitives, combining the primitives into the visual event, determining the normalized visual quality value for the feature vector average of the adjacent pair of visual event primitives, setting the binary fake scan indicator variable for the visual event, and processing the visual event as the function of the set binary fake scan indicator variable and the non-video retail transaction log data associated with the video stream.

3. The method of claim 1, wherein the steps of determining the normalized visual quality value and associating the visual event with the logged item bar code scan transactions comprise applying a mixed integer quadratic algorithm as a function of an objective having a visual quality linear term and a temporal quality quadratic term.

4. The method of claim 3, wherein the setting the binary fake scan indicator variable to true or false comprises weighting the binary variable by a quality derived from an infinite Gaussian mixture modeling of video content.

5. The method of claim 4, wherein the combining the set of the primitives into the visual event comprises:
 defining the visual event as a temporally ordered sequential set of the primitives that are each associated with an appearance node representing visual information and a location node denoting a spatial location of occurrence as a function of an appearance likelihood model, a spatial likelihood model for each primitive and a transition probability to a next temporally ordered primitive of the sequential set.

6. The method of claim 4, wherein the steps of determining the normalized visual quality value and associating the visual event with the logged item bar code scan transactions comprises:
 representing an overall quality measure of the temporally ordered sequential set primitives as a function of a temporal affinity set by a Gaussian transformed temporal distance determined as a function of an upper bound on a number of the primitives, a temporal constraint, the Gaussian transformed temporal distance alignment constraint on alignment with the logged transaction of the transaction log, and an integer constraint on the binary fake scan indicator variable.

7. The method of claim 4, wherein the step of determining the normalized visual quality value further comprises selecting spatial-temporal salient points by:
    taking locally maximum points of a squared weighted gradient norm function as interest points in the video stream; and
    excluding points of the squared weighted gradient norm with values below a threshold percentile.

8. The method of claim 4, wherein the combining the set of the primitives into the visual event further comprises:
    treating each of the primitives as a bag of features as function of the feature vectors; and
    determining parameters of clusters and proportions of each of the clusters in an infinite Gaussian mixture model.

9. The method of claim 8, wherein the determining the parameters of the clusters and the proportions of the each of the clusters in the infinite Gaussian mixture model further comprises:
    using a best-scored model for each of the primitives;
    checking the primitives for consistency by using average log-likelihoods of the best-scored models; and
    defining the linear term for visual quality as a Gaussian transformed average over an adjacent pair of the primitives.

10. A computer system for automated analysis of video data for determination of human behavior, comprising:
    a central processing unit, computer readable memory and a computer readable storage media;
    first program instructions to segment a video stream of images of a cashier in a retail scanning lane into a plurality of discrete individual frame image primitives comprising:
        pick-up primitive segments that each comprise sequential frames of the video stream that have motion pixels associated with movement of at least one of an item and a hand of the cashier within an item pick-up region of interest of the retail scanning lane video stream images;
        scan primitive segments that each comprise sequential frames of the video stream that have motion pixels associated with movement of at least one of an item and a hand of the cashier within an item scanning region of interest of the retail scanning lane video stream images that is different from the pick-up region of interest; and
        drop primitive segments that each comprise sequential frames of the video stream that have motion pixels associated with movement of at least one of an item and a hand of the cashier within an item drop region of interest of the retail scanning lane video stream images that is different from the pick-up and scanning regions of interest;
    second program instructions to combine a set of one each of the pick-up, scan and drop primitives that are sequential and closest in time to each other into a visual event, wherein the visual event pick-up primitive is prior in time to the visual event scan primitive, and the visual event scan primitive is prior in time to the visual event drop primitive; and
    third program instructions to determine a normalized visual quality value of one or zero for an average of feature vectors over an adjacent pair of the visual event primitives as a function of a Gaussian mixture model, and to set a binary fake scan indicator variable for the visual event to true if the determined normalized visual quality value is one, or to false if the determined normalized visual quality value is zero; and
    fourth program instructions to process the visual event as a function of the binary fake scan indicator variable and of non-video retail transaction log data associated with the video stream that lists items scanned in the scanning lane, by:
        associating the visual event with one of a plurality of logged item bar code scan transactions of the non-video transaction data if the visual event is aligned with the one logged transaction within a Gaussian transformed temporal distance constraint;
        issuing an alert that the visual event is a fake scan if the binary fake scan indicator variable is true and the visual event does not align with any of the logged transactions within the Gaussian transformed temporal distance constraint; and
        dropping the visual event if the binary fake scan indicator variable is false and the visual event does not align with any of the logged transactions within the Gaussian transformed temporal distance constraint;
    wherein the first, second, third and fourth program instructions are stored on the computer readable storage media for execution by the central processing unit via the computer readable memory.

11. The system of claim 10, further comprising fifth program instructions stored on the computer readable storage media for execution by the central processing unit via the computer readable memory for determining the normalized visual quality value and associating the visual event with the logged item bar code scan transactions by applying a mixed integer quadratic algorithm as a function of an objective having a visual quality linear term and a temporal quality quadratic term.

12. The system of claim 11, further comprising sixth program instructions stored on the computer readable storage media for execution by the central processing unit via the computer readable memory for setting the binary fake scan indicator variable to true or false by weighting the binary variable by a quality derived from an infinite Gaussian mixture modeling of video content.

13. The system of claim 12, further comprising seventh program instructions stored on the computer readable storage media for execution by the central processing unit via the computer readable memory for combining the set of the primitives into the visual event by:
    defining the visual event as a temporally ordered sequential set of the primitives that are each associated with an appearance node representing visual information and a location node denoting a spatial location of occurrence as a function of an appearance likelihood model, a spatial likelihood model for each primitive and a transition probability to a next temporally ordered primitive of the sequential set.

14. The system of claim 12, further comprising eighth program instructions stored on the computer readable storage media for execution by the central processing unit via the computer readable memory for determining the normalized visual quality value and associating the visual event with the logged item bar code scan transactions by:
    representing an overall quality measure of the temporally ordered sequential set primitives as a function of a temporal affinity set by a Gaussian transformed temporal distance determined as a function of an upper bound on a number of the primitives, a temporal constraint, the Gaussian transformed temporal distance alignment constraint on alignment with the logged transaction of the transaction log, and an integer constraint on the binary fake scan indicator variable.

15. A computer program product for automated analysis of video data for determination of human behavior, said computer program product comprising:

a computer readable tangible storage medium which is not a signal and has computer readable program code embodied therewith, the computer readable program code comprising instructions that, when executed by a computer processing unit, cause the computer processing unit to:

segment a video stream of images of a cashier in a retail scanning lane into a plurality of discrete individual frame image primitives comprising:

pick-up primitive segments that each comprise sequential frames of the video stream that have motion pixels associated with movement of at least one of an item and a hand of the cashier within an item pick-up region of interest of the retail scanning lane video stream images;

scan primitive segments that each comprise sequential frames of the video stream that have motion pixels associated with movement of at least one of an item and a hand of the cashier within an item scanning region of interest of the retail scanning lane video stream images that is different from the pick-up region of interest; and drop primitive segments that each comprise sequential frames of the video stream that have motion pixels associated with movement of at least one of an item and a hand of the cashier within an item drop region of interest of the retail scanning lane video stream images that is different from the pick-up and scanning regions of interest;

combine a set of one each of the pick-up, scan and drop primitives that are sequential and closest in time to each other into a visual event, wherein the visual event pick-up primitive is prior in time to the visual event scan primitive, and the visual event scan primitive is prior in time to the visual event drop primitive; and determine a normalized visual quality value of one or zero for an average of feature vectors over an adjacent pair of the visual event primitives as a function of a Gaussian mixture model, and to set a binary fake scan indicator variable for the visual event to true if the determined normalized visual quality value is one, or to false if the determined normalized visual quality value is zero; and process the visual event as a function of the binary fake scan indicator variable and of non-video retail transaction log data associated with the video stream that lists items scanned in the scanning lane, by:

associating the visual event with one of a plurality of logged item bar code scan transactions of the non-video transaction data if the visual event is aligned with the one logged transaction within a Gaussian transformed temporal distance constraint;

issuing an alert that the visual event is a fake scan if the binary fake scan indicator variable is true and the visual event does not align with any of the logged transactions within the Gaussian transformed temporal distance constraint; and dropping the visual event if the binary fake scan indicator variable is false and the visual event does not align with any of the logged transactions within the Gaussian transformed temporal distance constraint.

16. The computer program product of claim 15, further comprising program instructions stored on the computer readable storage medium that, when executed by the computer processing unit, cause the computer processing unit to determine the normalized visual quality value and associate the visual event with the logged item bar code scan transactions by applying a mixed integer quadratic algorithm as a function of an objective having a visual quality linear term and a temporal quality quadratic term.

17. The computer program product of claim 16, further comprising program instructions stored on the computer readable storage medium that, when executed by the computer processing unit, cause the computer processing unit to set the binary variable to true or false by weighting the binary fake scan indicator variable by a quality derived from an infinite Gaussian mixture modeling of video content.

18. The computer program product of claim 17, further comprising program instructions stored on the computer readable storage medium that, when executed by the computer processing unit, cause the computer processing unit to combine the set of the primitives into the visual event by:

defining the visual event as a temporally ordered sequential set of the primitives that are each associated with an appearance node representing visual information and a location node denoting a spatial location of occurrence as a function of an appearance likelihood model, a spatial likelihood model for each primitive and a transition probability to a next temporally ordered primitive of the sequential set.

19. The computer program product of claim 17, further comprising program instructions stored on the computer readable storage medium that, when executed by the computer processing unit, cause the computer processing unit to determine the normalized visual quality value and associating the visual event with the logged item bar code scan transactions by:

representing an overall quality measure of the temporally ordered sequential set primitives as a function of a temporal affinity set by a Gaussian transformed temporal distance determined as a function of an upper bound on a number of the primitives, a temporal constraint, the Gaussian transformed temporal distance alignment constraint on alignment with the logged transaction of the transaction log, and an integer constraint on the binary fake scan indicator variable.

20. The method of claim 9, wherein the step of checking the visual event primitives for consistency by using average log-likelihoods of the best-scored models comprises:

learning a model ($M_A$) for a one of the visual event primitives (a), and a model ($M_B$) for another of the visual event primitives (b); and checking for consistency in the learned models by determining average log-likelihoods from a first formulation $$\left( \min \left\{ \frac{1}{n} \sum_{i=1}^{n} \log_{p M_A}(b_i) \right\} \right),$$

and a second formulation $$\left(\frac{1}{m}\sum_{i=1}^{m}\log_{pM_B}(a_i)\right);$$

defining a Gaussian transformed average of the average log-likelihood values determined from the first and second formulations over all adjacent pairs of the visual event primitives as a visual quality of the visual event; and normalizing the visual quality of the visual event defined by the Gaussian transformed average to zero or one.

21. The computer system of claim 10, further comprising ninth program instructions stored on the computer readable storage media for execution by the central processing unit via the computer readable memory for checking the visual event primitives for consistency by using average log-likelihoods of best-scored models by:

learning a model ($M_A$) for a one of the visual event primitives (a), and a model ($M_B$) for another of the visual event primitives (b); and checking for consistency in the learned models by determining average log-likelihoods from a first formulation $$\left(\min\left\{\frac{1}{n}\sum_{i=1}^{n}\log_{pM_A}(b_i)\right\}\right),$$

and a second formulation $$\left(\frac{1}{m}\sum_{i=1}^{m}\log_{pM_B}(a_i)\right);$$

defining a Gaussian transformed average of the average log-likelihood values determined from the first and second formulations over all adjacent pairs of the visual event primitives as a visual quality of the visual event; and normalizing the visual quality of the visual event defined by the Gaussian transformed average to zero or one.

22. The computer program product of claim 15, further comprising program instructions stored on the computer readable storage medium that, when executed by the computer processing unit, cause the computer processing unit to check the visual event primitives for consistency by using average log-likelihoods of best-scored models by:

learning a model ($M_A$) for a one of the visual event primitives (a), and a model ($M_B$) for another of the visual event primitives (b); and checking for consistency in the learned models by determining average log-likelihoods from a first formulation $$\left(\min\left\{\frac{1}{n}\sum_{i=1}^{n}\log_{pM_A}(b_i)\right\}\right),$$

and a second formulation $$\left(\frac{1}{m}\sum_{i=1}^{m}\log_{pM_B}(a_i)\right);$$

defining a Gaussian transformed average of the average log-likelihood values determined from the first and second formulations over all adjacent pairs of the visual event primitives as a visual quality of the visual event; and normalizing the visual quality of the visual event defined by the Gaussian transformed average to zero or one.

* * * * *